June 7, 1966     A. E. JONEIKIS     3,254,555
SEPARATION BOLT
Filed Aug. 26, 1963     2 Sheets-Sheet 1

INVENTOR.
ALBERT E. JONEIKIS
BY
W. H. Maxwell
AGENT

June 7, 1966  A. E. JONEIKIS  3,254,555
SEPARATION BOLT
Filed Aug. 26, 1963  2 Sheets-Sheet 2
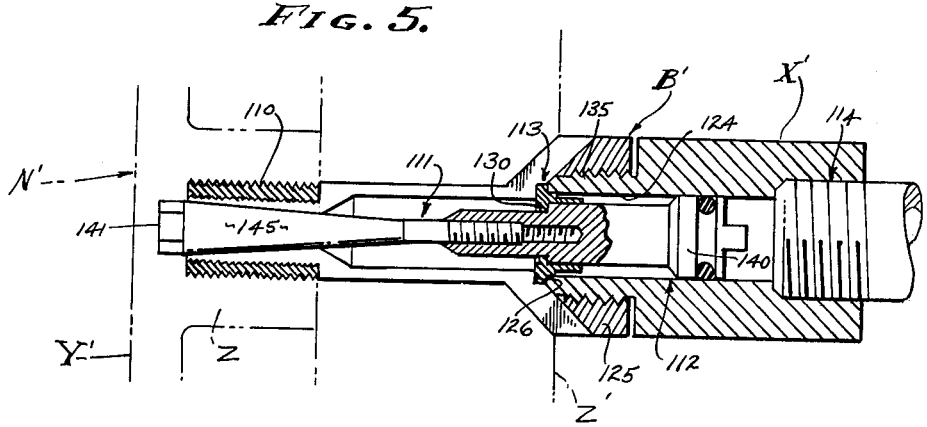
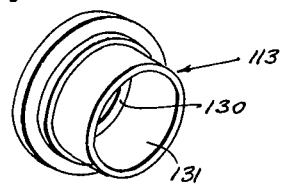
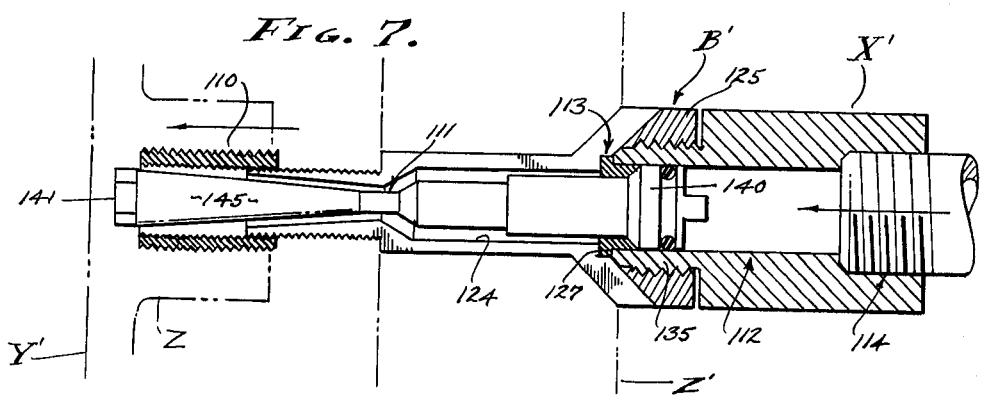
INVENTOR.
ALBERT E. JONEIKIS
BY
W. H. Maxwell
AGENT United States Patent Office 3,254,555
Patented June 7, 1966

3,254,555
SEPARATION BOLT
Albert E. Joneikis, Long Beach, Calif., assignor to Harvey Aluminum (Incorporated), Torrance, Calif., a corporation of California
Filed Aug. 26, 1963, Ser. No. 304,460
5 Claims. (Cl. 85—77)

This invention has to do with a fastener of the releasable type and wherein two or a pair of components are subjected to forceful connection, and particularly to a connection wherein the fastener functions as a bolt subjected to tensile loading and whereupon release is effected by the application of an external force without the loosing of parts, without the creation of fragments or discharge of contaminating materials, and with control over insertia of either of said two parts.

Fasteners of the type under consideration are employed for the release of separable components of equipment such as the stages of rockets and the like. For the most part, such fasteners can be made to operate after a fashion, but certain refinements are ordinarily not obtainable and are highly desirable in order to achieve near perfection in certain endeavors, such as required in rocketry. For instance, it is highly desirable to have equipment which is separable without the creation of loose parts and fragments and/or contamination, and it is mandatory in some instances that no thrust whatsoever be applied to any part. However, there are instances when an exacting thrust must be applied in a predetermined manner. A releasable fastener is provided by the present invention and which comprises an elongate body having an expansible portion and an internally and externally threaded sleeve engaged over the expansible portion, there being a shaft movable axially to release the expansible portion from normal engagement with the sleeve. Therefore, it is a general object of this invention to provide a separation fastener, or bolt, that operates to release two separable components without the creation of loose parts and/or fragments, without the production of contaminants such as the discharge of gases, and with controlled thrust.

It is an object of this invention to provide a bolt type fastener that is operable remotely to release parts normally joined thereby and whereby the separable parts of the fastener remain associated with the respective parts for reuse, and whereby no parts of the fastener are loosed in the process of release. That is, all major parts and elements involved are captive, there being two assemblies of elements involved.

It is an object of this invention to provide a bolt type fastener that is operable remotely to release parts normally joined thereby and whereby actuation for release is effected without the discharge of materials. That is, the fluids or gases normally employed to effect release of such devices is in this instance held captive, at least during the process of release and for a substantial time thereafter.

It is an object of this invention to provide a bolt type fastener that is operable remotely to release parts normally joined thereby and whereby actuation and release controllably affects inertia in the two assemblies of parts, and whereby the desired amount of thrust is imparted to said parts that are held by the fastener and then released. One form of the invention as herein disclosed imparts no thrust whatsoever while a second form of the invention as herein disclosed includes a mechanism to positively move the two assemblies of parts relative to each other, said movement being independent of the release function.

It is also an object of this invention to provide a separation fastener of the character thus far referred to and which is adapted to be pre-stressed or loaded in such a manner that its operation is assured upon actuation initiated by a minimal signal.

It is still another object of this invention to provide a fastener having all of the features hereinabove referred to and which is nevertheless conventional in all respects as compared with an ordinary bolt type fastener. That is, the instant fastener is or can be a bolt type of fastener and is usable as such, in which case the body has a head at one end and a threaded nut applicable at the other end.

The various objects and features of this invention will be fully understood from the following detailed description of the typical preferred forms and applications thereof, throughout which description reference is made to the accompanying drawings, in which.

Figure 2:
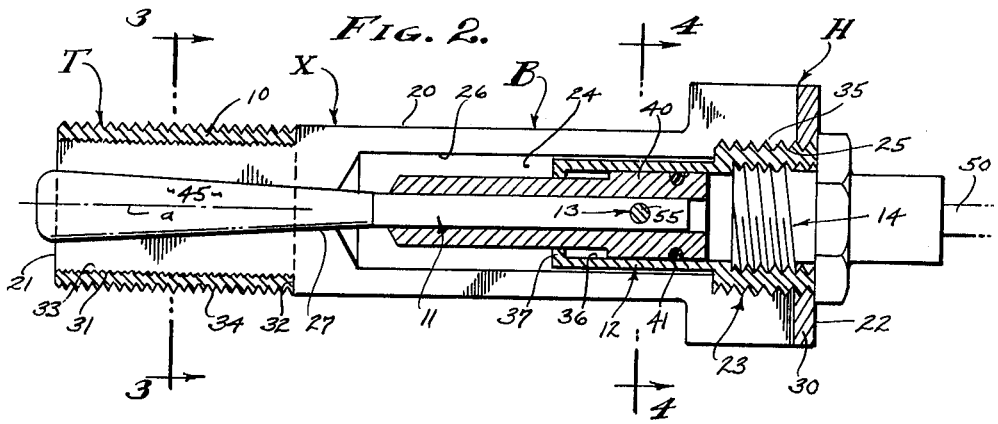
FIG. 2 is an enlarged view of the bolt removed from the installation of FIG. 1 and showing parts in longitudinal section.
Figure 3:
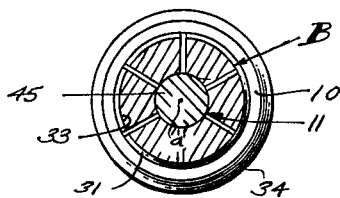
Figure 4:
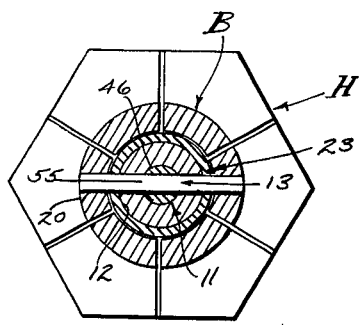

FIGS. 3 and 4 are transverse sectional views taken as indicated by lines 3—3 and 4—4 on FIG. 2.

Figure 1:
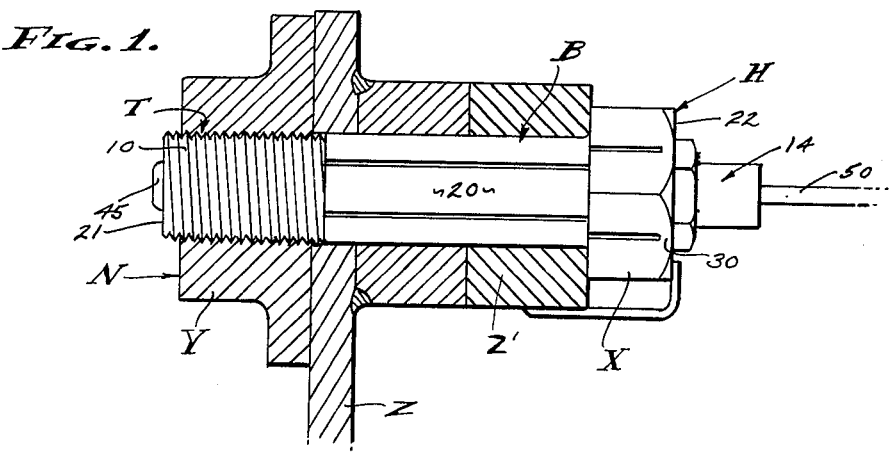
FIG. 1 is a view showing a typical installation of separation bolt.

FIG. 5 is a view similar to FIG. 1 and shows a second form of the invention.

FIG. 6 is a perspective view of the expandable part shown in FIG. 5.

FIG. 7 is a view similar to FIG. 5 showing said expandable part acted upon by operation of the device.

The separation fastener as it is disclosed herein is a bolt type fastener and has all of the advantages and versatility of an ordinary bolt, without any limitation. Therefore, the fastener includes generally, a body B with a head H, there being threads T at the end of the body remote from the head, and a nut N to threadedly engage on the threads. It is to be understood, however, that a nut N can be applied to the threads T in lieu of the head H, in which case the fastener is releasable at two opposite ends. That is, the separation fastener can be provided with releasable threads at both ends. As shown, there is release at but one end of the fastener, in which case the head H is conventional and formed as an integral enlargement of the end of the body B.

In the first form of the invention illustrated in FIGS. 1 to 4 there are seven basic elements that form the structure, including the nut N as shown in FIG. 1 of the drawings. The basic elements are referred to in the following description as the body B, a sleeve 10, a shaft 11, a cylinder 12, a holder 13, an actuator 14, and the nut N. Further, the said elements above are assimilated into two assemblies wherein the said elements remain captive, there being a bolt assembly X and a nut assembly Y. The two assemblies X and Y are then united following the exact manner and procedure that is followed when installing an ordinary bolt, for example, to clamp two parts Z and Z' together. Thus, the bolt type fastener is applied under tension by tightening of the nut N, to force the part Z into tight engagement with or onto the part Z'.

The body B which lends the characteristic appearance to this fastener is an elongate rod-shaped cylinder having an outer diameter wall 20 turned concentric with a central axis $a$. The body terminates at flat ends 21 and 22 that lie in planes normal to said axis, the end 21 being the end that receives the nut N and the end 22 being the end that carries the head H. In accordance with the invention, the body B comprises the main element of the bolt assembly X, being fashioned at the end 21 to be releasably secured to the assembly Y. Further, the body comprises a housing 23 that accommodates the elements 11, 12, 13 and 14.

In the preferred form, the body B has a stepped bore 24 extending therethrough, in which case the said body is essentially tubular. The bore 24 enters the head end 22 having a large threaded portion 25 to receive the actuator 14, an intermediate portion 26 to accommodate the cylinder 12, and a reduced portion 27 to cooperatively engage with the shaft 11. The said portions 25, 26 and 27 are turned concentric with the axis $a$, the cylinder 12 being fitted into said intermediate portion 26 with clearance for the shaft 11 to project freely therefrom.

In accordance with the invention, the body B is adapted to be expanded and is split into at least several finger shaped parts that are flexibly joined at the end 22. In practice, two right angularly related cuts extend longitudinally of the body, thereby splitting the body into four like segments, said segments being integrally joined by a continuous disc-shaped wall 30 at the end 22. Thus, the finger shaped body segments can deflect radially inward at the remote end 21.

In accordance with the invention, the body B is stepped to a reduced diameter at the end 21, said diameter being adapted to receive the sleeve 10. As is shown, the reduced diameter is provided with an external thread 31 of V form and preferably of relatively small configuration or size. The said thread 31 at said reduced diameter terminates at an axially facing shoulder 32 in a plane normal to the axis $a$.

In accordance with the invention, the body B is also tapered at the stepped bore 24, the reduced portion 27 of said bore being tapered, for example at 3°, to flare radially outward toward end 21. Said portion 27 is co-extensive with and underlies the threads 31 whereby said taper can be utilized to apply radial force outwardly lengthwise of the entire longitudinal extent of the sleeve 10, when the elements of assembly X are together.

The sleeve 10 is a straight cylindrical part of tubular cross-section, having an internal diameter with threads 33 of a V form to mate with the threads 31. These threads are helical so that the sleeve 10 is screwed onto the body B and into tight seated engagement against shoulder 32. In accordance with the invention, the external diameter of the sleeve 10 is formed with threads 34 co-extensive therewith, said threads 34 being of a size and configuration normally employed to accept an ordinary nut or the like. It is preferred, ordinarily, that the maximum diameter of the threads 34 does not exceed the diameter of wall 20 of the body. Thus, it will be apparent that a nut N is readily threaded onto the sleeve 10.

The cylinder 12 is in the end of a liner that occupies the stepped bore 24 at portions 25 and 26 thereof. The said body B, as it is shown, cannot be employed as a cylinder since it is split into segments that are necessarily spaced somewhat. Therefore, the cylinder 12 is provided and which is secured in the bore 24, as by an externally threaded head 35 that engages with the internally threaded portion 25. The cylinder 12 has a barrel 36 of reduced diameter that extends into portion 26 and it has an end wall 37 through which the shaft 11 slides. The inner diameter of the barrel 36 is a straight smooth bore so as to be slidably engaged by a piston and seal.

The shaft 11 is in the form of a rod or ram, an enlarged portion of which forms a piston 40 that is slidable in the barrel 36. The piston carries an annular seal 41 to engage the bore of barrel 36, and the rod-shaped shaft extends freely through an opening in the wall 37 to project into the area of the body occupied by the sleeve 10. In accordance with the invention, the shaft 11 is sectional, having a separate mandrel section 45 which is tapered the same as the said portion 27 of bore 24. The said mandrel section 45 is movable relative to the piston end of the shaft 11 and it has a stem 46 that slidably enters an opening in the piston part to be carried thereby and positioned therein.

The actuator 14 can vary widely and may be any source of fluid pressure or the like, applicable in the cylinder 12 to move the piston or shaft 11 toward the end 21. The example shown in the first form of the invention employs an electrically operated explosive squib 50 that is activated remotely through suitable electrical connections. In practice said squib 50 comprises a plug that threads into the body B of the cylinder 12 in order to close the head thereof. Energizing of the squib 50 through the electrical connections that are indicated results in an expansion of gas (a limited volume) in the cylinder 12 to thereby move the shaft 11 and shifting the mandrel sections 45 for release of the body segments (inwardly).

The structure hereinabove described as the first form of the invention is made up by the construction of the assembly X, which involves the following: the cylinder 12 is inserted into the body B and the shaft 11 is introduced to approximate working position, with the piston moved to the head of the cylinder and so as to nearly engage the squib 50. The sleeve 10 is then threaded onto the said V threads of the body B and tightly against the shoulder 32, whereupon the tapered shaft mandrel section 45 is adjusted axially as by the application of force in a suitable press or the like, until the said V threads at 31 and 33 are in tight contact. Now, the holder 13 in the form of a shear pin 55 is installed by through drilling of aligned holes to receive the same, said holes extending through the cylinder 12 and shaft 11 (also the body B). The squib 50 is finally installed and the assembly X is complete, but which includes the one part 10 that will become an element of assembly Y when the fastener is operated so as to be released.

With the fastener or bolt assembly as above described, the usual nut N is threaded onto the same and this completes the assembly Y by its assembly with the sleeve 10. It will be apparent how the parts Z and Z' are clamped together, and upon ignition of a suitable charge in the squib 50, the piston 40 is moved by shearing off the pin 55, thereby moving the shaft 11 and mandrel section 45 so as to release the threads 31 and 33. The shaft 11 being of substantially smaller diameter than the piston 40 remains engaged by the pin 55, since the pin will not shear at this point of connection. The body segments are permitted to move radially inward as effected by the camming action due to the relative axial movement of the parts as caused by the pre-stressed or loaded condition which is thereby relieved. Thus, the energy stored in the stress of the fastener parts is utilized to effect release, whereby no thrust and/or no restriction is imposed upon movement of the parts Z and Z'.

Referring now to the second form of the invention illustrated in FIGS. 5 to 7, again there are seven basic elements that form the structure, including the nut N' as shown in FIG. 5 of the drawings. The basic elements are referred to in the following description as the body B', a sleeve 110, a shaft 111, a cylinder 112, a holder 113, an actuator 114, and the nut N'. In this form of the invention the same two assemblies X' and Y' are involved with modification in the actuator 114 and with improvements in the holder 113. The body B' is essentially the same as the body B above described and has each and every feature hereinabove referred to. However, the stepped bore 124 presents a rearwardly facing step 126 to face and oppose the head 135 which is threaded into the enlarged portion 125 of the said stepped bore. This step 126 and opposed end face 127 of head 135 affords a clamp to position and retain the holder 113 to be described.

The sleeve 110, shaft 111, and cylinder 112 are the same in all respects as the elements 10, 11 and 12 above described, except that the end face 127 of the head opposes the step 126. However, the shaft 111 is modified by having an adjustable connection with its mandrel section 145. As shown, it is preferred that the mandrel section 145 be threadedly engaged in the piston 140, in which case a polygonal head or the like is provided at the foremost end of the mandrel for engagement by a wrench or like tool. As shown, the said foremost end of of the mandrel is flattened at 141 and is engageable with, say for example, the part Z' in order to move said part Z' an exact distance, thereby imparting thrust as determined by the fluid pressure applied. Therefore, it will be seen that the mandrel section 145 can be threadedly adjusted into the piston 140, and when the tapered exterior of the mandrel engages tightly in the body B' there is locked engagement of the parts by virtue of the self-locking angle of the gradual taper. Upon release action, said release can be assured before the application of thrust, as circumstances may require.

In accordance with the second form of the invention now under consideration the holder 113 is an expendable part that is inserted between the step 126 and face 127 by removing the head 135 and reinstalling the same. Further, the holder 113 is a part that protects the actuable elements of the structure, namely, the shaft 111 and body B'. That is, the holder 113 functions to retain the structure in readiness for release and also protects the reusable elements by limiting movement of and by cushioning the relatively moving parts. In its preferred form, the holder 113 is a ring of aluminum or other relatively soft and malleable material. The said ring is captured between the step 126 and face 127 and is characterized by an inwardly disposed flange 130 that provides shearing engagement with the front end, or a step, on the shaft 111. The step on the shaft is of lesser diameter than the inner diameter of the step 126 and the axial extent of said flange is limited whereby said flange is readily sheared off by the application of suitable axial pressure. In order to limit travel of the piston 140 relative to the body B' the holder 113 has a columnar part in the form of a tube 131 that surrounds the shaft 111 and which projects rearward to be engaged by the enlarged head of the piston 140, preferably an outwardly tapered head, as shown. The tube 131, or equivalent part, does not fully occupy the annulus in which it is normally accommodated, and therefore has radial area into which it can be deformed, as shown in FIG. 5. Thus, the ring shaped holder 113 is deformable when struck by the piston 140 and gradually and completely arrests the piston when it is deformed to substantially or fully occupy the said annulus, as shown in FIG. 7.

The actuator 114 in the case illustrated is a fitting adapted to be connected to a fluid pressure source for the actuation of the piston with consequent release of the fastener. It will be apparent when considering this second form of the invention that the holder 113 of soft material will permit the shearing action above described without detrimental effect on the relatively moving parts involved and thereafter performs an arrestment function. Therefore, the main elements of the structure are reusable and only the expendable holder 113 need be replaced. With a new holder 113 it is thereby possible to gain exact repositioning of the parts involved for further use of the complete structure.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A pre-stressed releasable fastener of the character described including:
   (a) an elongate tubular body having an axial bore therethrough, said bore being cylindrical in one end of said body and tapered in the other end to define a shoulder at the junction of the cylindrical and tapered portions of said bore, at least said tapered bore portion being segmented and radially expansible, said tapered bore diverging toward its free end whereby said shoulder is spaced from said ends and said body portion in the area of said tapered bore being provided with an external circumferential cam-shaped projection,
   (b) an externally threaded sleeve releasably connected over said expansible portion and with an internal circumferential cam-shaped projection to axially engage with the first mentioned projection on the body,
   (c) releasable means comprising a piston operable in said cylindrical portion of said bore and a tapered mandrel extending axially from said piston and adjustably slidable relative to the piston so as to be engaged with the tapered bore,
   (d) and a shear pin engaged through the piston and mandrel and into the body portion to hold the adjusted mandrel yieldingly engaged in said tapered bore and so as to release, by shearing, upon force exerted by the piston.

2. A releasable fastener of the character described including:
   (a) an elongate tubular body having an axial bore therethrough, said bore being cylindrical in one end of said body and tapered in the other end to define a shoulder at the junction of the cylindrical and tapered portions of said bore, at least said tapered bore portion being segmented and radially expansible, said tapered bore diverging toward its free end whereby said shoulder is spaced from said ends, and said body portion in the area of said tapered bore being provided with an external axially disposed projection,
   (b) an externally threaded sleeve releasably connected over said expansible portion and with an internal circumferential cam-shaped projection to oppose and axially engage with the first mentioned projection on the body,
   (c) means comprising a piston operable in said cylindrical portion of said bore and a tapered mandrel extending axially from said piston and adjustably slidable relative to the piston so as to be engaged with the tapered bore and said piston having an axially faced end opposed to the said shoulder in the body.
   (d) and an expendable part placed between the shoulder in the body and end of the piston and said part being of collapsible material so as to release the piston upon exertion of force by said piston.

3. A device for releasably connecting first and second members comprising an elongated tubular body having at a first end thereof a radially expandable portion, means for securing the body to the first of the members to be connected, the radially expandable portion being externally threaded at one end thereof; a sleeve portion positioned over the radially expandable portion and being internally threaded for engagement with the externally threaded end of the radially expandable portion for the attachment to the second of the members to be connected, and having thereon an externally threaded portion for securing the sleeve to the second of the two members to be connected; and a movable shaft within the body, having thereon means to radially expand the first end of the body to effect engagement of the outwardly threaded portion thereof with the internally threaded portion of the sleeve when the shaft is in a first position within the body, and to allow radial contraction of the end of the body when the shaft is in a second position, whereby the first and second members may be threadedly connected when the shaft is in its first position, and may be slidably disconnected when the shaft is in its second position.

4. The device of claim 3 including means to apply an axial force to the shaft, and means positioned within the body portion to engage the shaft to prevent its movement except in response to the application of a sufficiently large axial force.

5. The device of claim 3 including releasing means to move said shaft from the first position to the second position and means positioned within the body portion to engage the shaft and to prevent its movement except in response to operation of the releasing means whereby the expandable portion may be radially contracted, to separate the sleeve and the attached second member therefrom.

References Cited by the Examiner

UNITED STATES PATENTS

| | | | |
|---|---|---|---|
| 2,570,618 | 10/1951 | Werner | 85—2 |
| 2,718,809 | 9/1955 | Kraft | 85—2 |
| 3,119,298 | 1/1964 | Brown | 85—1 |

CARL W. TOMLIN, *Primary Examiner.*

EDWARD C. ALLEN, *Examiner.*

M. PARSONS, JR., *Assistant Examiner.*